US008612367B2

(12) United States Patent
Xu et al.

(10) Patent No.: US 8,612,367 B2
(45) Date of Patent: Dec. 17, 2013

(54) LEARNING SIMILARITY FUNCTION FOR RARE QUERIES

(75) Inventors: Jingfang Xu, Beijing (CN); Gu Xu, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 357 days.

(21) Appl. No.: 13/021,446

(22) Filed: Feb. 4, 2011

(65) Prior Publication Data
US 2012/0203717 A1 Aug. 9, 2012

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| 5,418,951 | A | 5/1995 | Damashek | |
|---|---|---|---|---|
| 6,032,151 | A * | 2/2000 | Arnold et al. ........................ | 1/1 |
| 6,285,999 | B1 | 9/2001 | Page | |
| 8,209,178 | B1 * | 6/2012 | Talbot et al. ................... | 704/255 |
| 2007/0106662 | A1 * | 5/2007 | Kimbrough et al. .............. | 707/5 |
| 2008/0114721 | A1 * | 5/2008 | Jones et al. ....................... | 707/2 |
| 2008/0313128 | A1 * | 12/2008 | Arasu et al. ...................... | 707/2 |
| 2009/0024607 | A1 | 1/2009 | Sun et al. | |
| 2009/0204636 | A1 * | 8/2009 | Li et al. ..................... | 707/103 Y |
| 2010/0082511 | A1 | 4/2010 | Niu et al. | |
| 2010/0198857 | A1 | 8/2010 | Metzler et al. | |
| 2010/0312782 | A1 * | 12/2010 | Li et al. ......................... | 707/769 |

OTHER PUBLICATIONS

Liu et al., Learning Similarity Measures in Non-Orthogonal Space, CIKM '04, Nov. 8-13, 2004.*
Bailey, et al. Mining Historic Query Trails to Label Long and Rare Search Engine Queries—Published Date: 2010.
Broder, et al. Online Expansion of Rare Queries for Sponsored Search—Published Date: Apr. 20, 2009.
Broder, et al. Robust Classification of Rare Queries Using Web Knowledge—Published Date: Jul. 23, 2007.
Charikar, et al. "Similarity Estimation Techniques from Rounding Algorithms" STOC 2002, May 19-21, 2002, Montreal Quebec ACM 1-58113-495-9/02/0005 9 pages.
Dave, et al. Predicting the Click-Through Rate for Rare/New Ads— Published Date: Apr. 23, 2010.
Xu, et al. "Improving Quality of Training Data for Learning to Rank Using Click-Through Data" WSDM' 10 Feb 4-6, 2010, 10 pages.

* cited by examiner

*Primary Examiner* — Kakali Chaki
*Assistant Examiner* — Michael Zidanic
(74) *Attorney, Agent, or Firm* — Lee & Hayes, PLLC (57) ABSTRACT

Techniques are described for determining queries that are similar to rare queries. An n-gram space is defined to represent queries and a similarity function is defined to measure the similarities between queries. The similarity function is learned by leveraging training data derived from user behavior data and formalized as an optimization problem using a metric learning approach. Furthermore, the similarity function can be defined in the n-gram space, which is equivalent to a cosine similarity in a transformed n-gram space. Locality sensitive hashing can be exploited for efficient retrieval of similar queries from a large query repository. This technique can be used to enhance the accuracy of query similarity calculation for rare queries, facilitate the retrieval of similar queries and significantly improve search relevance.

19 Claims, 5 Drawing Sheets

LEARNING SIMILARITY FUNCTION FOR RARE QUERIES

BACKGROUND

Many query processing tasks such as query suggestion, query reformulation, and query expansion implicitly or explicitly calculate and utilize query similarity. In query suggestion, a user may be provided with similar queries that represent the same or related search intent as a current user provided query. Query reformulation attempts to transform the current query into a similar but better-formed query to help a user find more relevant documents. In query expansion, similar terms (e.g., words) are added to an original query in order to improve the relevance of the search results for the original query. In some sense, the expanded query can also be viewed as a similar query to the original query.

Various approaches for measuring query similarity have been proposed for different applications using different data sources. Most of these approaches are mainly focused on common or frequent queries. However, in general, the distribution of web search queries follows a heavy tailed power-law distribution. This implies that a major proportion of queries are in fact rare queries, or queries that may have been issued infrequently.

User behavior data, including click-through and session data, has been widely accepted as an important data source to accurately calculate query similarity. The basic idea behind various methods which utilize user behavior data for query similarity calculation is that two queries should be similar to each other if they share similar behavior patterns (e.g., many co-clicked URLs or co-occurred sessions). These various methods generally work well on common queries, but often perform poorly on rare queries, as there is typically insufficient user behavior data (e.g., data sparsity) for rare queries.

Several methods have been proposed to determine similarities between queries based on user behavior data, but such methods do not overcome the problem of data sparsity on rare queries. Additionally, in an extreme case, some rare queries may be missing in the user behavior data, or never previously entered into an associated search engine.

Traditionally, cosine similarity and/or bag-of-words assumptions are widely employed to measure the similarities between text strings. However, utilizing traditional techniques, there are two fundamental impediments to accurate similarity calculation: term ambiguity (i.e., terms that are literately the same but semantically different) and term dependency (i.e., terms that are literately different but semantically similar). These issues are exacerbated in query similarity calculation since many queries are typically very short.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

The disclosure describes techniques for learning similarity functions that are suitable for rare queries, as well as common queries. An original n-gram space and a transformed n-gram space are defined to represent queries, and a similarity function is defined, based on the transformed n-gram space, to measure similarities between queries. Queries are represented using n-grams in an n-gram space and a similarity function is automatically learned by leveraging training data derived from user behavior data. A metric learning method is employed to automatically learn the similarity function, including dependencies between n-grams. Additionally, rare queries are represented in the same way as common queries, such that the techniques proposed herein are applicable to finding similarities for both rare and common queries.

The similarity function is used to address the two challenges of term ambiguity (i.e., terms that are literately the same but semantically different) and term dependency (i.e., terms that are literately different but semantically similar). Compared with queries represented by unigrams, queries represented by n-grams convey more context information and may partially solve the problem of term ambiguity. Defining a similarity function based on the own content (e.g., words, terms, phrases, n-grams and/or associated data) of queries provides a more robust solution and is applicable to both common and rare queries.

To address the problem of term dependency, the similarity function is derived using the transformed n-gram space where some terms are no longer orthogonal or independent. Additionally, in the transformed space, even similar query pairs without common terms may have high similarity scores. Thus, knowledge learned from common queries is leveraged to improve the similarity calculation on rare queries. Moreover, hashing, such as locality sensitive hashing based on aspects of the learned similarity function, is employed for indexing queries and to facilitate fast retrieval of similar queries.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Example Environment

Figure 1:
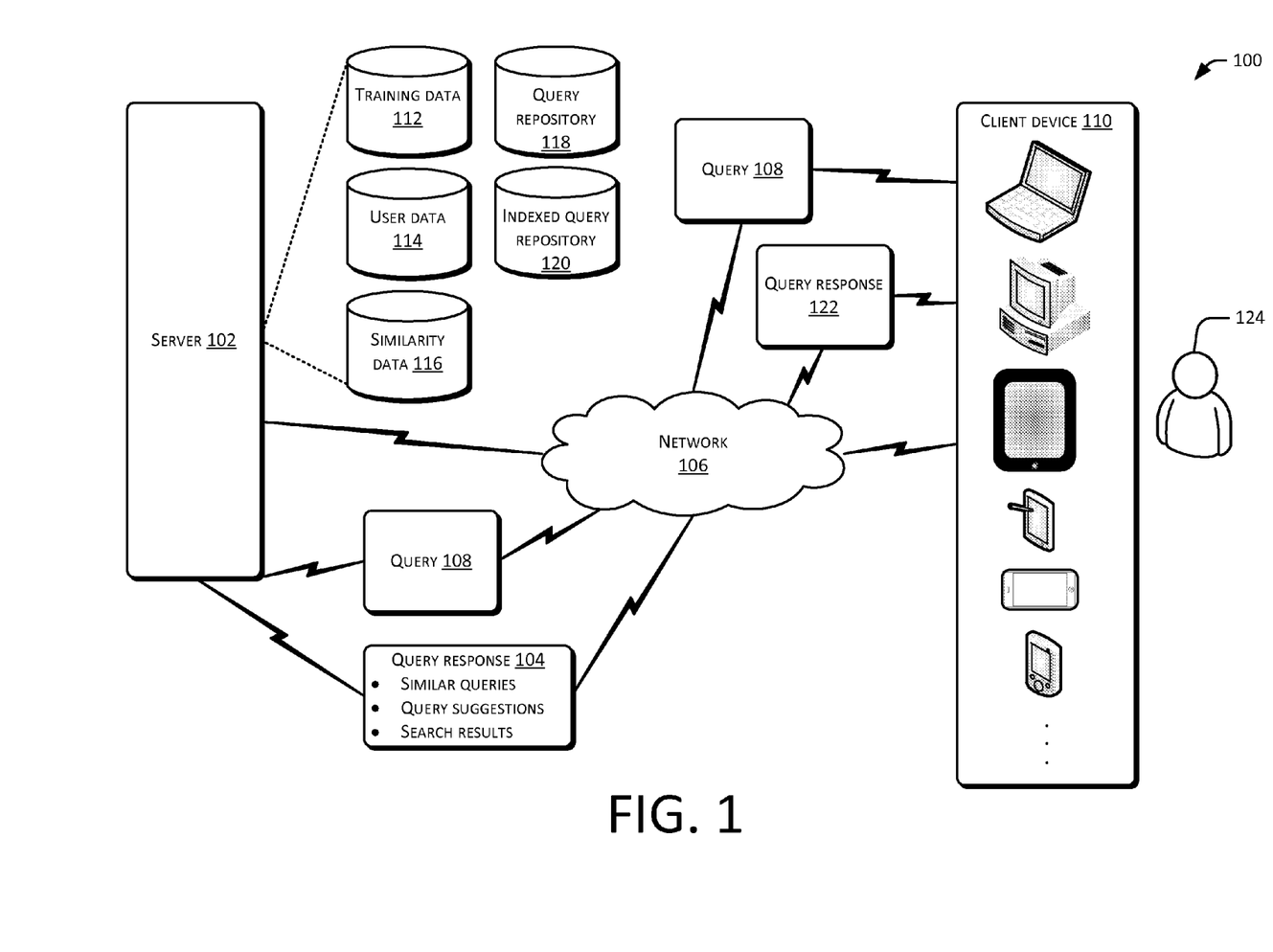
FIG. 1 is a pictorial diagram of an example environment for finding similarities for a query.

FIG. 1 illustrates an example environment 100 usable to determine similarities for a query based on a learned similarity function. Example environment 100 includes server(s) 102 that provides a query response 104 over a network 106 in response to a query 108 from client device 110. Network 106 is representative of, for example, the Internet, intranet, or the like.

Client device 110 represents various types of network capable devices configured to send a query and receive a query response via a network 106. Examples of client device 110 include a desktop computer, laptop computer, client computer, server computer, fixed or mobile computing device, wearable or implanted computing device, or the like.

Server 102 represents one or more various types of network capable devices configured to receive a query 108 and provide a query response 104 via a network 106. Server 102 may include one or more computing devices located at a single location, such as a data center, or located at multiple disparate locations accessible via network 106 and/or other networks (not shown).

Server 102 is configured for learning a similarity function from training data and user data extracted from, for example, a training data repository 112 and a user data repository 114. As part of learning the similarity function, server 102 may use a similarity data repository 116 to store intermediate and/or final data in support of the learning process.

The similarity function learning process may progress until appropriate convergence conditions are met. In one aspect, convergence conditions may include the learning of the similarity function and/or an objective function until a convergence threshold is reached. In another aspect, convergence conditions may include the learning of the similarity function and/or an objective function until a predetermined rate of change threshold is reached. In another aspect, convergence conditions may include the learning of the similarity function and/or an objective function until a specified degree of accuracy is obtained based on a testing dataset. In another aspect, learning may continue at any point and/or be continuous with multiple or continuous convergence conditions utilized. Other convergence conditions known in the art for learning functions may also be utilized. The learning process is discussed in greater detail below.

Server 102 is further configured to generate one or more hashing functions that are based on data learned from the similarity function learning process. Server 102 then utilizes the one or more hashing functions to index, for example, a large repository of queries, such as queries located in a query repository 118, into an indexed query repository 120. Indexed query repository 120 may contain indexes to query sets that are determined to be similar, and are thus similarly indexed. In an example implementation, queries that are determined to be similar are assigned identical index values.

Repositories 112-120 may be the same or separate repositories, may be co-located with server 102, integrated within server 102, located at one or more disparate locations relative to server 102, or any combination thereof.

The similarity function learning process and the indexing of queries in indexed repository 120 may be preformed offline. In one aspect, the one or more hashing functions are generated and queries are indexed after convergence conditions have been reached in the similarity function learning process. In another aspect, the similarity function learning process may be extended or repeated based on new or different training data. In this case, queries may be re-indexed after convergence conditions have been reached in the extended or repeated similarity function learning process.

As an example of an online process, client device 110 sends a query 108 to server 102 via network 106. Server 102 receives query 108, either directly or indirectly from client device 110, and computes a hash value of query 108 based on the one or more determined hashing functions. Server 102 then maps the computed hash value to an index in, for example, indexed query repository 120. In another aspect, the hash functions are used to directly calculate the appropriate index value of query 108. Similar queries associated with the computed index are determined. Server 102 determines query response 104 based on the similar queries associated with the determined index. Server 102 returns query response 104 over network 106 in response to receiving query 108. Query response 104 may include a list of similar queries, query suggestions, and/or search results, or the like. In response to sending query 108, client device 110 receives query response 122. Query response 122 may be the same as query response 104 provided by server 102, or it may be a different response provided by, for example, a third party responder (not shown) in response to receiving query response 104.

Figure 2:
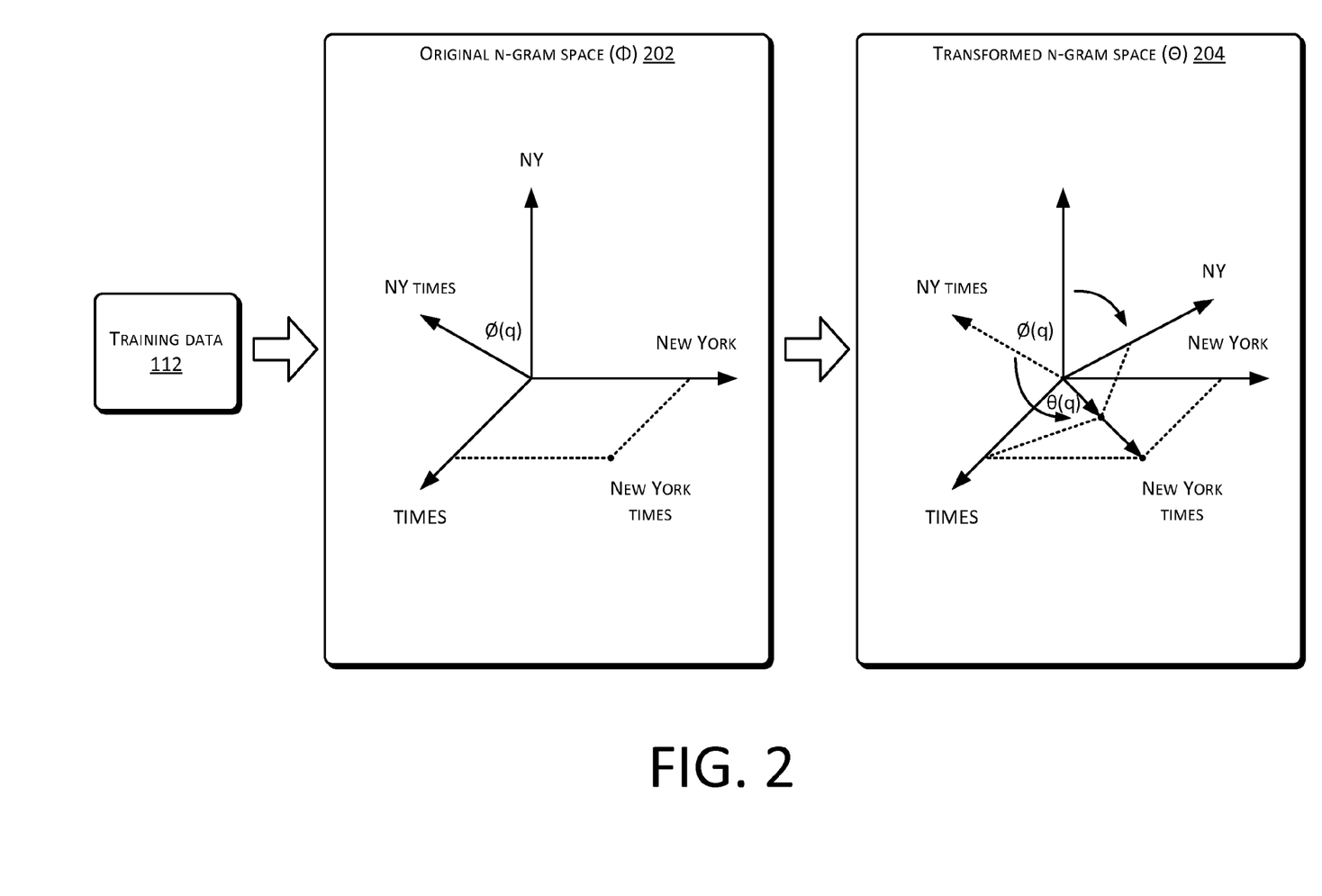
FIG. 2 is a pictorial diagram of an example of n-gram spaces used to define a similarity function.

FIG. 2 illustrates example n-gram vector spaces where queries are represented. These n-gram vector spaces are used to define the similarity function and hashing functions discussed previously. For example, queries extracted from training data repository 112 are represented as vectors in original n-gram space 202 (Φ), where each dimension of original n-gram space 202 is represented by a unique n-gram determined from the extracted queries. In an aspect, each dimension (i.e., unique n-gram) of original n-gram space 202 is independent (i.e., orthogonal) with respect to each other dimension of original n-gram space 202.

To illustrate this, FIG. 2 shows an example mapping of the queries "NY Times" and "New York Times" in original n-gram space 202. In these two queries, the n-grams, "NY," "Times," and "New York," are represented as independent and orthogonal dimensions in original n-gram space 202. The queries "NY Times" and "New York Times" are shown mapped to the three independent and orthogonal dimensions in original n-gram space 202. Furthermore, the query "NY Times" is shown represented by vector $\phi(q)$ in original n-gram space 202. Examples of n-gram vectors for the two queries, "NY Times" and "New York Times", are shown in Table 1.

TABLE 1

Examples of n-gram Vectors

| Query | Vectors in n-gram vector space (ny, new, york, times, ny times, new york, . . . ) |
|---|---|
| NY times | (1, 0, 0, 1, 1, 0, . . . ) |
| New York times | (0, 1, 1, 1, 0, 1, . . . ) |

As opposed to representing queries using user behavior data in a unigram space model (i.e., a space model constrained to only n-grams of size one), an n-gram space model (i.e., a space model including n-grams greater than size one) is chosen having n-grams as the basic units of query representation. This is advantageous because compared with unigrams, n-grams convey richer context information. This richer context information is useful in similarity calculations, especially when query terms are ambiguous. Also, an n-gram representation of queries only depends on language, and not on the availability and quality of external data, such as user behavior data. Therefore, rare queries, which often cannot be described by user behavior data, can be represented in the same way as common queries by using an n-gram representation of queries. Thus, in an n-gram space, the "vocabulary" is a set of n-grams.

FIG. 2 further illustrates transformed n-gram space 204. In transformed n-gram space 204, one or more n-grams (e.g., independent dimensions) of original n-gram space 202 are transformed such that they become dependent (e.g., non-orthogonal) with one or more other n-grams of transformed n-gram space 204. In transformed n-gram space 204, a transformation is shown that makes the angle between vectors representing n-grams "NY" and "New York" approach zero. As shown in transformed n-gram space 204, the vector representing the term "NY" is no longer orthogonal or independent with other dimensions in transformed n-gram space 204. Rather, the vector representing the term "NY" projects onto one or more of the other dimensions in the transformed n-gram space 204. As shown, the transformed vector representing the n-gram "NY" projects onto the vector representing the n-gram "New York," which is represented as a dimension in both original n-gram space 202 and transformed n-gram space 204. Thus, the transformation makes the vector representing the n-gram "NY" and the vector representing the n-gram "New York" become dependent.

Furthermore, the vector ϕ(q) representing the query "NY Times" in original n-gram space 202 corresponds to transformed vector θ(q) in transformed n-gram space 204. As shown in transformed n-gram space 204, the distance between vectors representing the queries "NY Times" and "New York Times" is greatly reduced compared to the distance between the vectors representing these queries in original n-gram space 202.

There are many ways of defining a similarity function upon an n-gram space. Cosine similarity is a widely used similarity measure in related fields. However, directly defining the cosine similarity for query similarity calculation in original n-gram space 202 will not work well. This is because in original n-gram space 202, n-grams are assumed to be independent (e.g., orthogonal) relative to each other. This assumption of n-gram independence is too constraining to represent semantic similarities between queries represented in original n-gram space 202.

For example, the query "New York times" is similar to the query "NY times," but different from the query "movie times." However, in original n-gram space 202, cosine similarity will give the same similarity score to each pair of queries, "New York Times" and "NY Times," "New York Times" and "movie times," because "times" is the only common n-gram among the three queries.

In transformed n-gram space 204, the representation of the terms "NY" and "New York" are transformed to be as close as possible, such that there is some degree of dependency between these terms. Thus, a "preferred similarity function" is represented as a cosine similarity taken in transformed n-gram space 204. In this way, the cosine similarity between "New York times" and "NY times" will be much larger than that between "New York times" and "movie times".

Many existing techniques may be utilized to determine that terms such as "NY" and "New York" have similar meaning. In an embodiment, these types of term similarities are inherently learned as part of a similarity function learning process, as will be discussed in greater detail below.

Example System

Figure 3:
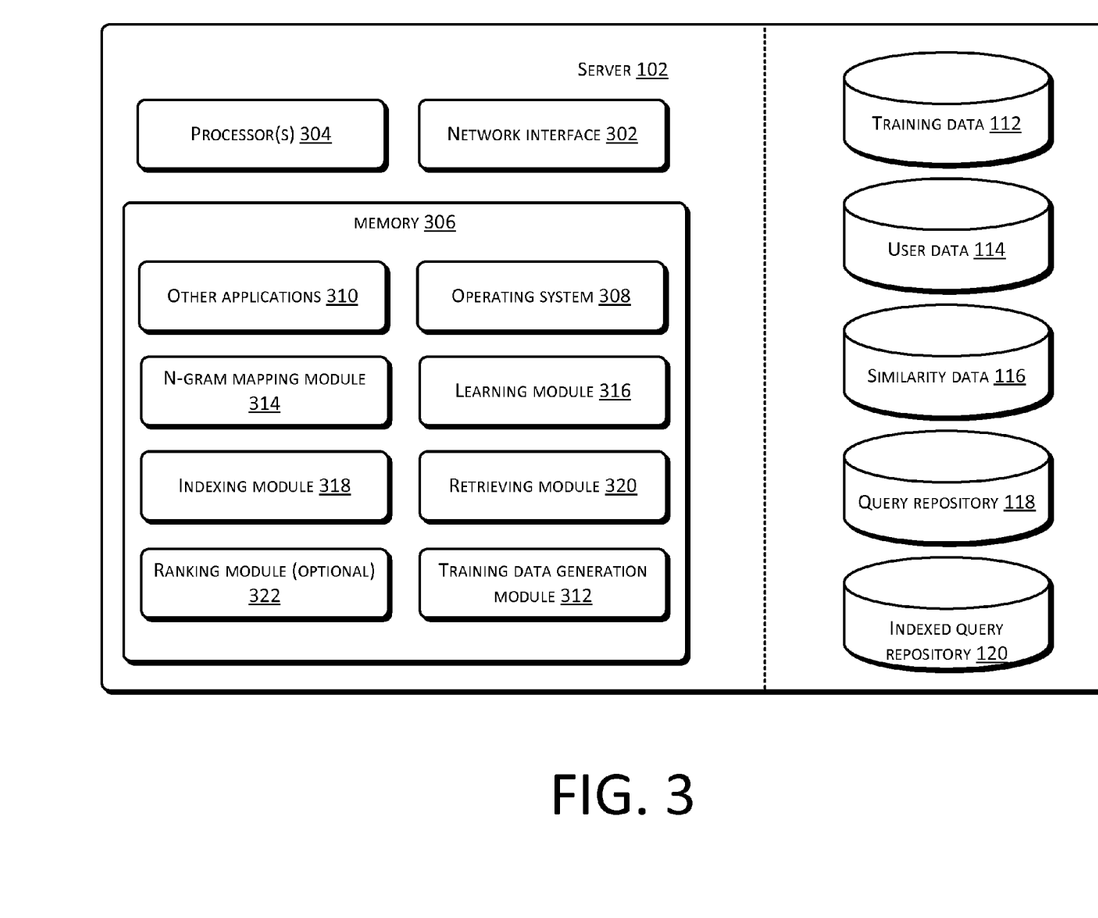
FIG. 3 is a block diagram that illustrates components of an example computing device for learning and using a similarity function.

FIG. 3 is a block diagram that illustrates various components of an example computing device, such as server 102, for learning and using a similarity function.

Example server 102 includes one or more network interfaces 302, one or more processors 304, and memory 306. Network interface 302 enables server 102 to communicate with other devices over a network, such as network 104.

An operating system 308, and one or more other applications 310 are stored in memory 306 as computer-readable instructions, and are executed, at least in part, on processor(s) 304. Operating system 308 facilitates execution of, and Input/Output (I/O) for, applications, software modules, software objects, applets, components and the like, as is common in the art.

Example server 102 also includes a training data generation module 312, n-gram mapping module 314, learning module 316, indexing module 318 and retrieving module 320. Example server 102 may also include an optional ranking module 322.

Training data generation module 312 is used for the generation of training data stored, for example, in training data repository 112. Training data generation module 312 utilizes web search data (e.g., queries) extracted from, for example, query repository 118, or one or more other query repositories (not shown). Training data generation module 312 may also utilize user behavior data (e.g., click-through data and/or session data) associated with one or more of the extracted queries. Such user behavior data may be stored in, and accessed from, user data repository 114, or one or more other repositories (not shown).

Training data generation module 312 facilitates the generation of training data from large scale web search data using a variety of techniques. Training data such as $S_+$ and/or $S_-$ may be selected using training data generation module 312, where $S_+$ includes similar query pairs (e.g., "New York times" and "NY times") and $S_-$ includes dissimilar query pairs (e.g. "New York times" and "movie times"). In general, two queries are determined to be similar if both have one dominant sense and/or share the same dominant search intent.

For example, in one aspect, training data generation module 312 facilitates the collection of query pairs known to be similar or dissimilar using human labeling. However, when the n-gram space is high-dimensional, a large number of query pairs are required, making human labeling a tedious process.

In another aspect, training data generation module 312 uses a Pearson coefficient method to automatically derive high quality similar and/or dissimilar query pairs using associated user behavior data (e.g., click-through data). Using this method, Pearson correlation coefficients are employed as similarity scores and/or dissimilarity scores to find appropriate query pairs.

For example, training data generation module 312 calculates Pearson coefficients for query pairs that share at least one co-clicked element in, for example, a click-through dataset. Then, query pairs whose Pearson coefficients are larger, and/or smaller than a predetermined number (e.g., 0.8) are randomly sampled from a large sampling of query pairs to select appropriate training data.

In another aspect, other techniques may be used by training data generation module 312 to automatically generate appropriate training data that includes similar and/or dissimilar query pairs.

Training data generation module 312 maintains information regarding similar and/or dissimilar query pairs, such as $S_+$ and/or $S_-$, for example, in training data repository 112, or in one or more other repositories.

As another example, using user behavior search log data, the training data generation module 312 uses a number of impressions and/or click-through data to classify common and rare queries. For example, queries whose impression frequencies are larger than a selected threshold are classified as common queries. Conversely, queries whose impression frequencies are smaller than a selected threshold are classified as rare queries. In general, it is common for many queries in an exemplary search log to be infrequent or rare queries. Training data generation module 312 maintains information regarding common and/or rare queries, for example, in training data repository 112, or in one or more other repositories.

For example, n-gram mapping module 314 extracts queries from training data repository 112, determines n-grams based on the extracted queries, represents each extracted query as a vector of one or more n-grams and maps each vector to an n-gram space, such as original n-gram space 202, as previously discussed. In one aspect, each unique determined n-gram is represented as a dimension of the n-gram space.

As an example, suppose that query q has k terms such that $q=q_1q_2 \ldots q_k$. Then there are n-grams $q_i \ldots q_{i+n-1}$ in q, where $i \leq k-n+1$. Thus:

$$q_1q_2 \ldots q_k \rightarrow \{q_1, q_2, \ldots q_k, q_1q_2, \ldots, q_{k-1}q_k, q_1q_2q_3, \ldots\}.$$

N-gram mapping module 314 represents each query q, of a plurality of extracted queries, as a vector, such as a finite dimensional vector, in original n-gram space 202. If an n-gram occurs in query q, then the value of the corresponding dimension of the associated n-gram vector is the number of times (i.e., frequency of occurrence) the n-gram appears in query q. The other values of the vector, corresponding to other dimensions of original n-gram space 202, are zero, or any other appropriate representation.

N-gram mapping module 314 determines n-grams from others of the extracted queries and represents each of the other queries by associated n-gram vectors in n-gram space. Thus, using the extracted queries and associated determined n-grams, n-gram mapping module 314 defines the n-gram space, including the dimensionality of the n-gram space. N-gram mapping module 314 may use training data repository 112, or any other repository, to store elements that represent the n-gram space, such as original n-gram space 202.

With the n-gram space defined, a new query may be represented as a vector mapped onto the n-gram space.

Furthermore, it is common in large query search logs for most queries to not have many associated clicks. In general, click-through data in user behavior data may be quite sparse. Therefore, it is advantageous to utilize an approach that is based on the own content of queries (e.g., n-grams in queries), and applicable to all queries including those that have little or no associated user behavior data.

Learning module 316 facilitates learning of a similarity function. In an embodiment, learning module 316 uses training data and information regarding similar and/or dissimilar query pairs, such as $S_+$ and/or $S_-$, to facilitate learning of the similarity function. For example, training data may include data stored in training data repository 112, which includes vector representations of queries mapped to original n-gram space 202.

In an embodiment, the similarity function to be learned using learning module 316, is derived as follows. Original n-gram space 202 is represented by $\Phi$, where $\Phi$ is a subset of space $R^m$ (i.e., $\Phi \subset R^m$), and m denotes the dimensionality (i.e., number of dimensions) of original n-gram space 202. A query q is represented as vector $\phi(q)$ in original n-gram space 202 (i.e., $\phi(q) \in \Phi$). Transformed n-gram space 204 is represented by $\Theta$, where $\Theta$ is a subset of space $R^k$ (i.e., $\Theta \subset R^k$), and k denotes the dimensionality (i.e., number of dimensions) of transformed n-gram space 204. Note that m may be less than, greater than or equal to k. In other words, the dimensionality of original n-gram space 202 may be different than the dimensionality of transformed n-gram space 204. In transformed n-gram space 204, dependencies between n-grams are considered. A query q is represented as vector $\theta(q)$ in transformed n-gram space 204 (i.e., $\theta(q) \in \Theta$).

L represents a linear transformation from original n-gram space 202 to transformed n-gram space 204 for the vector representation of query q, such that:

$$\theta(q) = L\phi(q) \quad (1)$$

where L represents a linear transform.

The cosine similarity between any two queries $q_i$ and $q_j$ in transformed n-gram space 204, is represented by:

$$\cos(\theta(q_i), \theta(q_j)) = \frac{\theta(q_i)^T \theta(q_j)}{\sqrt{\theta(q_i)^T \theta(q_i)} \sqrt{\theta(q_j)^T \theta(q_j)}} \quad (2)$$

Furthermore, the similarity between the queries $q_i$ and $q_j$ in transformed n-gram space 204, may be represented in original n-gram space 202 by the following similarity equation:

$$sim(\varphi(q_i), \phi(q_j)) = \frac{\phi(q_i)^T M \phi(q_j)}{\sqrt{\phi(q_i)^T M \phi(q_i)} \sqrt{\phi(q_j)^T M \phi(q_j)}} \quad (3)$$

where $M = L^T L$ (where $L^T$ is the transpose of L)

Note that the linear transformation L does not have to be explicitly defined, including its dimensionality k. Rather, information about the transformed space is encoded in matrix M. Also, the elements in the diagonal of matrix M represent weights (e.g., square of the norm) associated with corresponding n-grams, while off-diagonal elements of matrix M represent dependencies between n-grams.

In an embodiment, a metric learning method is employed to automatically learn the similarity function in an n-gram vector space by leveraging training data derived from user behavior data, such as training data in training data repository 112. The similarity function represented by equation (3) above, which measures similarity in transformed n-gram space 204, but is defined in original n-gram space 202, is learned by learning the matrix M. Such learning may be facilitated by optimizing the following objective function:

$$\max_{M \geq 0} \sum_{(q_i, q_j) \in S_+} \frac{\phi(q_i)^T M \phi(q_j)}{\sqrt{\phi(q_i)^T M \phi(q_i)} \sqrt{\phi(q_j)^T M \phi(q_j)}} - \sum_{(q_i, q_j) \in S_-} \frac{\phi(q_i)^T M \phi(q_j)}{\sqrt{\phi(q_i)^T M \phi(q_i)} \sqrt{\phi(q_j)^T M \phi(q_j)}} - \lambda \|M\|_1 \quad (4)$$

where $\|M\|_1$ denotes the sum of absolute values of elements in matrix M and $\lambda$ is a scaling factor that controls the sparsity of matrix M.

Note that the objective function represented by equation (4) is derived based on the similarity function in equation (3). $\|M\|_1$ in equation (4) above provides for a regularization which will lead to a sparse solution of M. The use of such regularization includes sparse methods and is a popular and powerful technique to improve efficiency in machine learning. Also, a sparse solution of M implies that an n-gram should only be related to a small number of other n-grams, and should be essentially independent from the rest of the n-grams. This type of relationship agrees with the nature of language.

Stated another way, the learning of M inherently facilitates the learning of n-gram dependencies between similar n-grams in transformed n-gram space 204. As an example, referring again to FIG. 2, as M in learned, the angle between the vectors representing the n-grams "New York" and "NY" in transformed n-gram space 204 is reduced, relative to the same angle measured in original n-gram space 202.

In one aspect, learning module 316 uses two sets of training data (e.g., $S_+$ and $S_-$ as described above) to learn the matrix M via learning supervised by the objective function shown above in equation (4). As described above, $S_+$ includes similar query pairs (e.g., "New York times" and "NY times") and $S_-$ includes dissimilar query pairs (e.g. "New York times" and "movie times"). M is learned such that similarities and/or similarity values between similar query pairs from $S_+$ are maximized, and similarities and/or similarity values between dissimilar query pairs from $S_-$ are minimized.

In another aspect, learning module 316 uses only the set of training data that includes similar queries (e.g., $S_+$) to learn the matrix M via supervised learning employing the objective function shown above in equation (4), with $S_-$ set to the NULL set.

In another aspect, learning module 316 uses only the set of training data that includes dissimilar queries (e.g., $S_-$) to learn the matrix M via supervised learning employing the objective function shown above in equation (4), with $S_+$ set to the NULL set.

Learning module 316 may store intermediate and/or final results of learning in similarity data repository 116, or one or more other repositories, for access by other modules as required.

Indexing module 318 facilitates query indexing. In an embodiment, indexing module 318 utilizes a high-dimensional indexing technique based on Locality Sensitive Hashing (LSH) to facilitate indexing of queries. The basic idea of LSH is to hash points into buckets using a family of locality sensitive hash functions, such that the points close to each other fall into the same bucket relative to points that are far apart. Extending this to queries, indexing module 318 indexes a first set of similar queries with a first index value (i.e., a first bucket), a second set of similar queries with a second index value (i.e., a second bucket), and so forth. Thus, each set of similar queries may share the same unique index value, while dissimilar queries may have different index values.

In an embodiment, to exploit the advantages of representing queries in transformed n-gram space 204, the family of locality sensitive hash functions uses the learned matrix M, as described above, such that the family of locality sensitive hash functions is based on cosine similarity measured in transformed n-gram space 204. The family of locality sensitive hash functions that uses the learned matrix M may be determined as described below.

For example, a family of hash functions $H=\{h:S\rightarrow 0,1\}$ for cosine similarity is defined based on a random hyperplane technique, where S represents an input space. A vector r is randomly sampled according to Gaussian distribution $N_n(0, I)$, where n is the dimensionality of S. For each r, a hash function $h_r$ in the family is defined in input space S as follows:

$$h_r(u) = \begin{cases} 1 & r^T u \geq 0 \\ 0 & r^T u < 0 \end{cases} \quad (5)$$

Each hash function $h_r$ may be interpreted as the sign of an inner product between r and an input vector $u \in S$. To consider the family of hash functions in, for example, transformed n-gram space 204, each hash function $h_r$ for each query vector $\theta(q) \in \Theta$ becomes:

$$h_r(\theta(q)) = \begin{cases} 1 & r^T(L\phi(q)) = (L^T r)^T \phi(q) \geq 0 \\ 0 & r^T(L\phi(q)) = (L^T r)^T \phi(q) < 0 \end{cases} \quad (6)$$

where $r \sim N_n(0, I)$.

Letting $v = L^T r \sim N_n(L^T 0, L^T I L) = N_n(0, M)$ and sampling u from $\Phi$ according to Gausian distribution $N_n(0, M)$, the family of hash functions based on transformed n-gram space 204, are calculated in original n-gram space 202, as follows:

$$h'_v(\phi(q)) = \begin{cases} 1 & v^T \phi(q) \geq 0 \\ 0 & v^T \phi(q) < 0 \end{cases} \quad (7)$$

Thus, in one aspect, the hash functions described by equation (7) are used for indexing and retrieving queries and are computed in original n-gram space 202. However, use of these hash functions is equivalent to indexing and retrieving queries in transformed n-gram space 204. Furthermore, original n-gram space 202 is generally more sparse than transformed n-gram space 204 because the transformation generally reduces sparsity. Thus, computing hash functions is more efficient in original n-gram space 202 due to its greater sparsity.

In one aspect, the family of hash functions described by equation (7) is used to index a large collection of queries, such as queries in query repository 118. The hash functions are used to index queries into buckets, each of the buckets associated with a unique index, such that queries similar to each other fall into the same bucket. In one aspect, each unique index may be associated with a unique one, or a set of hash values, of the family of hash functions. The indexes and/or indexed query associations are stored in indexed query repository 120. For example, when the family of hash functions is used to determine an index for a given query, indexed query repository 120 is used to identify one or more queries that are similar to the given query based on the queries having the same index. This facilitates fast retrieval of similar queries, as will be discussed in greater detail below.

In an embodiment, all or a portion of the operations of training data generation module 312, n-gram mapping module 314, learning module 316 and/or indexing module 318, as described above, are performed offline.

As part of online and/or offline operation, retrieving module 320 is configured to receive queries and return query responses. For example, retrieving module 320 is configured to receive a query from client device 110 or user 124 of client device 110, and provide a query response 104 which may include one or more similar queries, query suggestions and/or search results in response to the received query.

In one aspect, retrieving module 320 will receive a query, determine an appropriate index for the query using, for example, the hash functions of equation (7) above, and return similar queries having the same index from indexed query repository 120. In another aspect, retrieving module 320 will pass a received query to indexing module 318 for determining an appropriate index. Then, similar queries associated with the received query are returned to retrieving module 320. In another aspect, retrieving module 320 will return similar queries, query suggestions and/or search results associated with the received query.

Additionally, the techniques described herein may be used to discover various types of synonyms in n-grams and queries, such as spelling errors, abbreviations and numbers. Furthermore, similar queries can include those which do not share n-grams but are semantically similar (e.g., "email template" and "e-mail templates"), and dissimilar queries which share a large proportion of n-grams (e.g. "how to calculate gpa" and "how to calculate grades"). These and other advantages are obtained from using a similarity function and hash functions that are based on transformed n-gram space 204.

Optionally, ranking module 322 may be applied to rank query response results based on relevance to a received query. In one aspect, the similarity function described herein is used to facilitate relevance ranking of queries. For example, if two queries are similar, the click-throughs associated with one query can be used to improve the relevance of another query.

For example, given query q and document d, a simple ranking model can be a linear combination of the BM25 score (e.g., Okapi BM25 ranking) between q and d, denoted as bm25(q,d), and the PageRank score (e.g., PageRank link analysis algorithm) of d, denoted as pr(d). The number of clicks on document d associated with query q can be used to provide a new ranking model, exemplified by the following:

$$r(q,d) = \alpha \cdot bm25(q,d) + \beta \cdot pr(d) + \gamma \cdot \log \text{clk}(q,d) + (1-\alpha-\beta-\gamma) \cdot \Sigma_{q' \in s(q)} \text{sim}(q',q) \log \text{clk}(q',d) \quad (8)$$

where clk(q,d) denotes the number of clicks on d associated with query q, S(q) is the set of queries similar to q and sim(q',q) is the similarity score between queries q and q'.

The rationale behind the ranking model presented above in equation (8) is that if there are not enough clicks associated with q and d, clicks associated with similar queries (i.e., other queries in S(q)) are used to improve search relevance.

Note that parameters $\alpha$, $\beta$ and $\gamma$ in equation (8) above may be used as tuning parameters that are adjusted based on the training data utilized. Tuning parameter adjustment may be performed using a variety of known techniques, such as trial and error techniques or simulated annealing and/or based on optimization of an objective function that comprises a set of known ranking values (i.e., a testing dataset). In another aspect, tuning parameters may be adjusted to maximize a NDCG (e.g., normalized discounted cumulative gain) using a tuning set which may include queries, URLs and relevance labels.

Although illustrated in FIG. 3 as being stored in memory 306 of server 102, one or more of modules 312-322, or portions thereof, may be implemented using any form of computer-readable media that is accessible by server 102. Additionally, in alternate implementations, one or more components of operating system 308, and other applications 310 may be implemented as part of an integrated circuit that is part of, or accessible to, server 102. Furthermore, in alternate implementations, one or more components of one or more of modules 312-322, or portions thereof; may be implemented as part of any other device that may be implemented along a pathway between client device 110 and server 102.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Operation

Figure 4:
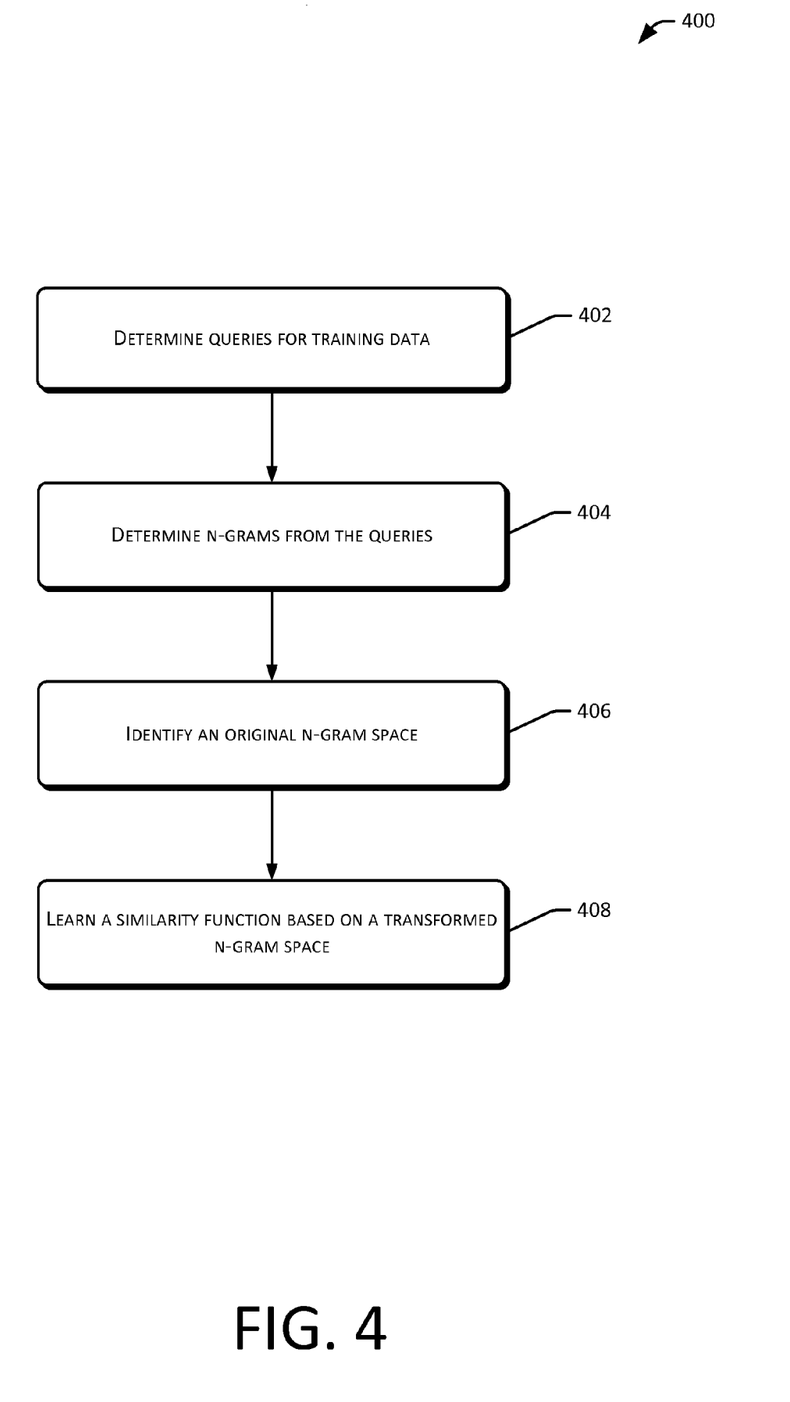
FIG. 4 is an example flowchart for learning a similarity function, indexing queries, retrieving queries and ranking queries.
Figure 5:
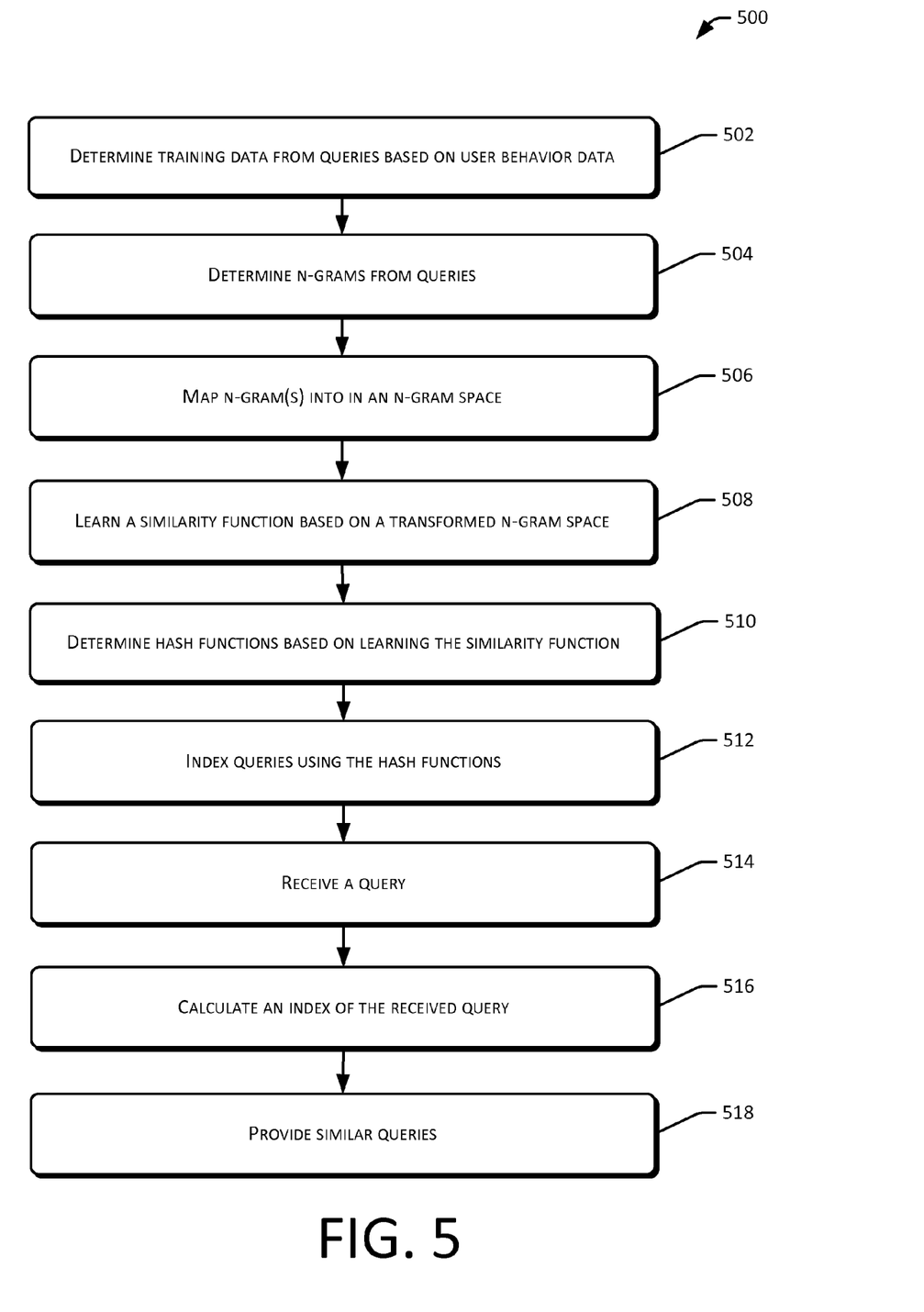
FIG. 5 is an example flowchart for learning a similarity function, indexing queries and providing similar queries in response to a received query.

FIGS. 4 and 5 illustrate example processes for learning a similarity function to facilitate providing query responses for received queries. The processes are illustrated as collections of blocks in logical flow graphs, which represent sequences of operations that can be implemented in hardware, software, or a combination thereof In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the illustrated processes, or alternate processes. Additionally, individual blocks may be deleted from the processes without departing from the spirit and scope of the subject matter described herein. Furthermore, while these processes are described with reference to server 102 described above with reference to FIGS. 1 and 3, other computer architectures may implement one or more portions of these processes, in whole or in part.

FIG. 4 shows an example procedure 400 to facilitate learning a similarity function. In block 402, queries are selected as training data. For example, as described above with reference to FIG. 3, n-gram mapping module 314 selects queries known to be similar from training data repository 112.

In block 404, n-gram mapping module 314 determines n-grams from the queries selected as training data. For example, in the two queries "New York times" and "NY times," unique n-grams may include "New York," "NY" and "times."

In block 406, n-gram mapping module 314 determines an n-gram space from the determined n-grams, such as original n-gram space 202. The determined n-gram space includes independent dimensions represented by unique n-grams, such as "New York," "NY" and "times," as shown in original n-gram space 202.

In block 408, learning module 316 learns a similarity function using the training data, such as from training data repository 112. The similarity function is learned based on similarities measured in a transform of the n-gram space, such as transformed n-gram space 204. For example, in transformed n-gram space 204, vectors representing the n-grams "New York" and "NY," represented by independent (e.g., orthogonal) dimensions of original n-gram space 202, are transformed such that the angle between these two vectors is reduced. Thus, in transformed n-gram space 204, the vectors representing the similar terms "New York" and "NY," are dependent on one another.

As described previously, in one aspect, learning module 316 learns the similarity function described by equation (3) facilitated, for example, by the optimization of the objective function described in equation (4). In another aspect, learning module 316 learns a similarity function rewritten as a distance function, as follows:

$$\text{sim}(\phi(q_i),\phi(q_j)) = 2 - 2(\phi(q_i) - \phi(q_j))^T M (\phi(q_i) - \phi(q_j)) \quad (9)$$

such that:

$$\phi(q_i)^T M \phi(q_i) = \phi(q_j)^T M \phi(q_j) = 1$$

Note in equation (9) above that $(\phi(q_i) - \phi(q_j))^T M (\phi(q_i) - \phi(q_j))$ is the Mahalanobis distance between $\phi(q_i)$ and $\phi(q_j)$.

Therefore, in equation (9), maximizing cosine similarity is equivalent to minimizing the Mahalanobis distance on the unit sphere. Accordingly, in another aspect, learning module 316 utilizes an objective function as follows:

$$\min_{M \succeq 0} \Sigma_{(q_1,q_2) \in S_+}(\phi(q_i)-\phi(q_j))^T M(\phi(q_i)-\phi(q_j)) - \Sigma_{(q_1,q_2) \in S_-}(\phi(q_i)-\phi(q_j))^T M(\phi(q_i)-\phi(q_j)) + \lambda \|M\|_1 \quad (10)$$

such that:

$$\phi(q_i)^T M \phi(q_i)=1, \phi(q_j)^T M \phi(q_j)=1$$

$$\forall (q_i, q_j) \in \{S_+ \cup S_-\}$$

By normalizing input n-gram vectors to unit length (i.e., for any query $q_i$ we have $\phi(q_i)^T \phi(q_i)=1$), and relaxing the constraints in equation (10) by introducing a penalty term, the objective function can be rewritten as follows:

$$\min_{M \succeq 0} \Sigma_{(q_1,q_2) \in S_+} \eta(\phi(q_i)-\phi(q_j))^T M(\phi(q_i)-\phi(q_j)) - \Sigma_{(q_1,q_2) \in S_-} \eta(\phi(q_i)-\phi(q_j))^T M(\phi(q_i)-\phi(q_j)) + \lambda \|M\|_1 + D_{Burg}(M\|I) \quad (11)$$

In equation (11) above, $D_{Burg}(.\|.)$ denotes a Burg matrix divergence (or Log Det divergence), used as the penalty term, which is a popular distance between matrices. Burg matrix divergence is defined as follows:

$$D_{Burg}(X\|Y)=tr(XY^{-1})-\log \det(XY^{-1})-c \quad (12)$$

In equation (12) above, c is the dimension of matrices X and Y, tr is a trace matrix operator and log det is a divergence estimator, such as a logarithm of the determinant of a matrix. The objective function of equation (11) may be rewritten in matrix form, as follows:

$$\min_{M \succeq 0} tr((I+\eta \Psi^T(\text{diag}(S/[1,\ldots,1]^T)-S)\Psi)M)- \log \det M + \lambda \|M\|_1 \quad (13)$$

In equation (13), $\Psi$ is a matrix stacked with n-gram vectors by column, S is a matrix whose element $s_{i,j}$ is 1 if the ith and jth queries are similar (as in $S_+$), −1 if the ith and jth queries are dissimilar (as in $S_-$) and 0 otherwise.

In equations (10), (11) and/or (13) above, the parameter $\eta$ effects the importance of supervisions, while $\lambda$ controls the sparsity of matrix M, which impacts training time. Exemplary values of the parameters are $\lambda=4$ and $\eta=1$.

FIG. 5 shows an example procedure 500 to facilitate learning a similarity function. In block 502, training data is determined using user behavior data. For example, sets of similar and/or dissimilar queries, such as similar and/or dissimilar query pairs, are determined as training data by n-gram mapping module 314. In one aspect, the sets of similar and/or dissimilar queries may include only common queries, which have associated user behavior data (e.g., click-through or session data). Common queries having associated user behavior data provide for a more accurate determination of the similarity or dissimilarity of query pairs compared to rare or infrequent queries, which have little or no associated user behavior data. In another aspect, the sets of similar and/or dissimilar queries may include common and/or rare queries.

In block 504, n-grams are determined from queries. For example, n-gram mapping module 314 determines n-grams from the own content of queries selected as training data. In one aspect, own content of queries includes, but is not limited to, words, terms, phrases and/or associated data of queries. In another aspect, own content includes words, terms and/or phrases of a query.

In block 506, n-grams are mapped into n-gram space. For example, n-gram mapping module 314 maps each n-gram of at least a subset of the queries in the training data into a vector represented in an n-gram space, such that each unique one of the n-grams represents an orthogonal dimension of the n-gram space. In one aspect, the mapping of these n-gram vectors effectuates the creation or determination of the n-gram space. In another aspect, the n-gram space may be defined directly by the n-grams determined from the queries of the training data.

In block 508, a similarity function is learned based on a transform of n-gram space. For example, learning module 316 learns the similarity function based on the training data. The similarity function is learned based on similarities measured in a transform of the n-gram space, such as transformed n-gram space 204, as determined through optimization of an objective function. Examples of suitable objective functions are provided above herein. In transformed n-gram space 204, one or more n-gram vectors represented as orthogonal dimensions of original n-gram space 202, are transformed such that the one or more vectors no longer represent orthogonal dimensions in transformed n-gram space 204. Thus, in transformed n-gram space 204, vectors representing similar n-grams may not be orthogonal with one another.

In block 510, hash functions are determined based on learning of the similarity function. For example, indexing module 318 determines a family of hash functions. An example of suitable hash functions are shown in equation (7) above. The hash functions are determined based on properties of transformed n-gram space 204, and are discovered as part of the similarity function learning process. As shown in equation (7), the hash functions are determined based on the learned matrix M.

In block 512, queries are indexed using the hash functions. For example, indexing module 318 indexes a large collection of queries, such as queries in query repository 118. In one aspect, queries are indexed by grouping each set of similar queries with a common index. Indexing module 318 uses the hash functions to facilitate indexing of queries.

In block 514, a new, common or rare query is received, for example, by retrieving module 320. This received query may, for example, be provided by client device 110 or user 124 of client device 110.

At block 516, an index for the received query is calculated. For example, retrieving module 320 facilitates calculating an index of the received query using the hash functions.

At block 518, one or more similar queries are provided. For example, retrieving module 320 facilitates providing one or more queries similar to the received query based on the calculated index. In one aspect, the one or more provided queries are extracted from indexed query repository 120.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

For example, technologies and/or techniques described herein are applicable to applications other than query processing, such as query-document matching, collaborative filtering and other applications that require similarity calculations.

The invention claimed is:
1. A method comprising:
    determining training data including queries;
    determining n-grams from own content of the queries;
    determining an n-gram space that represents the queries as
        one or more vectors in the n-gram space, each dimension
        of the n-gram space being independent and represented
        by a unique one of the n-grams;

identifying similar query pairs and dissimilar query pairs of the queries based at least in part on user behavior data, wherein the user behavior data includes at least one of click-through data or session data; and learning a similarity function using the identified similar query pairs and the dissimilar query pairs in the training data, the similarity function based at least in part on a transform of the n-gram space, the transform resulting in a transformed n-gram space having one or more of the unique n-grams being dependent on one or more other of the unique n-grams.

2. A method as recited in claim 1, wherein each query in the training data comprises a common query.

3. A method as recited in claim 1, the learning comprising employing a metric learning method to optimize an objective function.

4. A method as recited in claim 3, wherein the objective function is for learning a matrix M, and the objective function comprises:

$$\max_{M \geq 0} \sum_{(q_i, q_j) \in S_+} \frac{\phi(q_i)^T M \phi(q_j)}{\sqrt{\phi(q_i)^T M \phi(q_i)} \sqrt{\phi(q_j)^T M \phi(q_j)}} - \sum_{(q_i, q_j) \in S_-} \frac{\phi(q_i)^T M \phi(q_j)}{\sqrt{\phi(q_i)^T M \phi(q_i)} \sqrt{\phi(q_j)^T M \phi(q_j)}} \lambda \|M\|_1,$$

where $\phi(q_i)$ is a vector representation of one of the queries $q_i$ in the n-gram space, $\phi(q_j)$ is a vector representation of one of the queries $q_j$ in the n-gram space, $S_+$ comprises the similar query pairs in the training data, $S_-$ comprises the dissimilar query pairs in the training data, $\|M\|_1$ denotes the sum of absolute values of elements in matrix M and $\lambda$ is a scaling factor that controls sparsity of matrix M.

5. A method as recited in claim 1, the learning comprising optimizing an objective function to learn a matrix, and the method further comprising indexing a collection of queries for the transformed n-gram space using a high-dimensional indexing technique based at least in part on the learned matrix.

6. A method as recited in claim 5, wherein the high-dimensional indexing technique comprises use of Locality Sensitive Hashing (LSH) for generating locality sensitive hash functions that are based at least in part on a cosine similarity measured in the transformed n-gram space.

7. A method as recited in claim 5, the method further comprising:
receiving a new query;
retrieving one or more queries of the collection of queries that are similar to the new query based at least in part on the indexing.

8. A method as recited in claim 7, further comprising ranking the one or more queries of the collection of queries that are similar to the new query using the similarity function.

9. A method as recited in claim 1, the method further comprising:
deriving a family of hash functions in the n-gram space that are based on the transformed n-gram space;
indexing a collection of queries into individual sets of similar queries using the family of hash functions.

10. A method as recited in claim 1, wherein the n-gram space comprises a finite dimensional space.

11. A method as recited in claim 1, wherein determination of the one or more of the unique one of the n-grams that are dependent on the one or more other of the unique one of the n-grams is based in part on the learning.

12. A method as recited in claim 1, wherein the similarity function is defined by a cosine similarity in the transformed n-gram space.

13. A method as recited in claim 1, the learning comprising optimizing an objective function to learn a matrix, wherein elements on the diagonal of the matrix represent weights of corresponding n-grams and elements off the diagonal of the matrix represent dependencies between corresponding n-grams in the transformed n-gram space.

14. One or more computer storage media having instructions that, when executed by one or more processors, cause the processors to perform the method of claim 1.

15. A method of learning a similarity function for rare queries, the method comprising:
determining training data based in part on user behavior data, the training data including similar and dissimilar query pairs;
determining n-grams from own content of queries in the training data;
mapping the n-grams in the training data into vectors represented in an n-gram space, each unique one of the n-grams being represented as an orthogonal dimension of the n-gram space;
learning a similarity function using at least a subset of the training data, wherein the learning includes optimizing an objective function, the similarity function based at least in part on a similarity measurement in a transformed n-gram space having one or more of the unique n-grams being non-orthogonal with respect to one or more other of the unique n-grams, the objective function based at least in part on the transformed n-gram space;
determining a family of hash functions in the n-gram space that are based on the transformed n-gram space;
indexing queries from a collection of queries into sets of similar queries utilizing the family of hash functions;
receiving a rare query;
calculating an index for the rare query utilizing the family of hash functions; and
identifying an associated one of the sets of similar queries based on the index.

16. A method as recited in claim 15, the method further comprising:
applying a ranking function to rank the associated set of similar queries in an order based on relevance to the rare query, the ranking function being based in part on the similarity function; and
providing the associated set of similar queries in the order.

17. A method as recited in claim 15, wherein at least one of the similar or the dissimilar query pairs comprise common query pairs.

18. A system comprising:
a training data generation module stored on one or more memories and executed by one or more processors, the training data generation module to determine training data based at least in part on user behavior data, the training data comprising at least one of similar or dissimilar query pairs;
an n-gram mapping module stored on one or more memories and executed by one or more processors, the n-gram mapping module to:
determine n-grams from own content of queries in the training data; and map the n-grams into vectors represented in an n-gram space, each unique one of the n-grams being represented as an orthogonal dimension of the n-gram space;

a learning module stored on one or more memories and executed by one or more processors, the learning module to learn a similarity function using at least a subset of the training data by optimizing an objective function, the similarity function based at least in part on a similarity measurement in a transformed n-gram space having one or more of the unique n-grams being non-orthogonal with respect to one or more other of the unique n-grams, the objective function based at least in part on the similarity function;

an indexing module to:
  determine a family of hash functions in the n-gram space that are based on the transformed n-gram space; and
  index queries from a collection of queries into sets of similar queries utilizing the family of hash functions; and a retrieval module to:
  receive a new query;
  calculate an index for the new query utilizing the family of hash functions;
  utilize the index for the new query to retrieve one or more queries similar to the new query; and
  provide at least one of the one or more queries similar to the new query or information associated with the one or more queries similar to the new query.

19. A system as recited in claim 18, the system further comprising a ranking module to rank the one or more queries similar to the new query using the similarity function.

* * * * *